United States Patent [19]

Hellstrom

[11] Patent Number: 4,585,635

[45] Date of Patent: Apr. 29, 1986

[54] METHOD FOR PREPARING PB-$\beta''$-ALUMINA CERAMIC

[75] Inventor: Eric E. Hellstrom, Albuquerque, N. Mex.

[73] Assignee: The United States of America as represented by the United States Department of Energy, Washington, D.C.

[21] Appl. No.: 645,651

[22] Filed: Aug. 30, 1984

[51] Int. Cl.$^4$ .................. C01F 17/00; C01F 7/02; C01G 15/00
[52] U.S. Cl. .................. 423/263; 423/593; 423/594; 423/600
[58] Field of Search .............. 423/600, 263, 593, 594; 429/193

[56] References Cited

U.S. PATENT DOCUMENTS

| | | |
|---|---|---|
| 2,245,783 | 6/1938 | Hyde . |
| 3,266,940 | 8/1966 | Caesar . |
| 3,404,036 | 10/1968 | Kummer et al. . |
| 3,446,677 | 5/1969 | Tennenhouse ............... 501/119 |
| 4,197,171 | 4/1980 | Dunn . |

FOREIGN PATENT DOCUMENTS 64226 10/1982 European Pat. Off. ............ 423/600

OTHER PUBLICATIONS

Dunn et al., "Solid State Ionics", vol. 5, 1981, pp. 203–204.
Farrington et al., "Solid State Ionics", vol. 7, 1982, pp. 267–281.
Yao et al., "J. Inorganic & Nuclear Chem.", vol. 29, 1967, pp. 2453–2475.
Hellstrom et al., "Solid State Ionics", vol. 11, 1983, pp. 125–132.
Crosbie et al., "Journal of the American Ceramic Soc.", vol. 65, Apr. 1982, pp. 187–191.

*Primary Examiner*—H. T. Carter
*Attorney, Agent, or Firm*—Armand McMillan; Albert Sopp; Judson R. Hightower

[57] ABSTRACT

A process is disclosed for preparing impermeable, polycrystalline samples of Pb-$\beta''$-alumina ceramic from Na-$\beta''$-alumina ceramic by ion exchange. The process comprises two steps. The first step is a high-temperature vapor phase exchange of Na by K, followed by substitution of Pb for K by immersing the sample in a molten Pb salt bath. The result is a polycrystalline Pb-$\beta''$-alumina ceramic that is substantially crack-free.

10 Claims, No Drawings

METHOD FOR PREPARING PB-$\beta''$-ALUMINA CERAMIC

The U.S. Government has rights in this invention pursuant to contract No. DE-AC04-76DP00789 between the U.S. Department of Energy and AT&T Technologies, Inc.

BACKGROUND OF THE INVENTION

This invention relates to a method of preparing impermeable, polycrystalline Pb-$\beta''$-alumina bodies capable of having their electrical properties investigated, and suitable for use in devices such as ionic probes, for example, in PbO glass systems.

The invention relates more specifically to a method for preparing impermeable, polycrystalline samples of Pb-$\beta''$-alumina ceramic from Na-$\beta''$-alumina ceramic by ion exchange. The method permits Pb ions to be introduced into polycrystalline samples of material having the $\beta''$-alumina structure without causing cracking of the sample. Prior to applicant's invention, it was not possible to prepare single crystal Pb-$\beta''$-alumina from single crystal Na-$\beta''$-alumina because the samples always cracked, rendering them unusable. This cracking was due to resultant stresses caused by anisotropic lattice expansion of the crystal by replacement of the smaller Na ion by the larger Pb ion.

It is known from the prior art that divalent $\beta''$-alumina compositions can be prepared by ion exchange, (see "Divalent Cation Conductivity in $\beta''$-alumina"; B. Dunn, R. M. Ostrom, R. Seevers and G. C. Farrington; Solid State Ionics 5 (1981) 203–204 whose disclosure is incorporated herein by reference). In the method disclosed therein, single crystals of Na-$\beta''$-alumina were immersed in various molten salt baths to replace the entire sodium ion content with divalent ions. In the case of Pb++ exchange, a very rapid exchange was achieved with nearly complete replacement, i.e., 95%, in very short times at low temperatures of about 525° C. However, as noted previously, due to the fact that the Pb ion is so much larger than the Na ion, e.g., 1.21 angstroms as compared to 0.95 angstrom, if this substitution method is applied to polycrystalline samples the resultant stresses due to lattice expansion result in both microscopic as well as macroscopic cracking of the polycrystalline sample rendering it unsuitable for its intended use as an ionic probe as well as for other applications.

Other divalent cations have been substituted for Na ions in the Na-$\beta''$-alumina structure. In addition to Pb these are Sr, Ca, Zn, Fe, Mn, Cu, Ag, Sn, Cd and Ba. These substitutions, however, have been carried out using single crystal Na-$\beta''$-alumina. (For a discussion of substitution in single crystals see Solid State Ionics, Vol. 7 (1982) 267–281, "Divalent Beta"-Aluminas: High Conductivity Solid Electrolytes for Divalent Cations"; G. C. Farrington and B. Dunn).

Additionally, divalent cations (Ca, Sr, Ba, Zn, Cd, Sn and Pb) have been substituted for Na ions in polycrystalline Na-$\beta''$-alumina, (see Solid State Ionics, Vol. 11 (1983) 125–132, "Preparation and Properties of Polycrystalline Divalent-Cation $\beta''$-Alumina"; E. E. Hellstrom and R. E. Benner); however, divalent cations larger than the Na ions cause the polycrystalline samples to crack.

SUMMARY OF THE INVENTION

It is thus an object of the present invention to provide a process for preparing impermeable, polycrystalline samples of Pb-$\beta''$-alumina ceramic from Na-$\beta''$-alumina ceramic by ion exchange.

It is another object of the invention to provide a simple process for achieving the above-discussed ion exchange while eliminating cracking in the sample due to anisotropic expansion resulting from the substitution of the larger Pb ions for the smaller Na ions.

Still another object of the invention is to provide a simple two-step process for effecting the substitution of the Pb ions for the Na ions in Na-$\beta''$-alumina.

Upon further study of the specification and appended claims, further objects and advantages of this invention will become apparent to those skilled in the art.

In accordance with the invention, a method for substituting Pb ions for Na ions in the polycrystalline lattice structure of $\beta''$-alumina is provided. The polycrystalline Na-$\beta''$-alumina consists of an Al and O lattice and of Na ions which migrate in relation to the Al and O lattice under the influence of an electric field. The substitution method itself comprises heating the polycrystalline lattice structure and contacting said structure with a vapor source of K ions heated to a temperature essentially equal to the temperature of said polycrystalline structure, said temperature being high enough to cause replacement of the Na ions in said structure by K ions, and maintaining said structure and said source of K ions in contact at said temperature until at least about 90% of the Na ions in said structure are replaced by K ions. The resultant structure is then immersed in a molten Pb salt at a temperature high enough to cause substitution of the K ions by Pb ions, and maintaining said structure immersed in said molten Pb salt until at least about 90% of the cations in the lattice structure are Pb ions, whereby a Pb-$\beta''$-alumina crystalline structure substantially free of cracks is obtained.

In a more specific aspect, the invention comprises heating the polycrystalline structure with the vapor source of K ions to a temperature of at least 900° C., preferably above 1,000° C., and more preferably about 1,140° C. In this case, the contacting is maintained until at least 95% of the Na ions have been replaced by K ions, and more preferably until 97% to effectively 100% substitution has occurred. Likewise, immersion in the Pb salt is done at a temperature above 500° C., (i.e., a temperature sufficient to have a molten PbCl$_2$ salt) to about 800° C., and no higher than 1,300° C., and no higher than 1,300° C. Still more preferably, the molten salt of PbCl$_2$ is maintained at a temperature of about 550°–700° C., preferably 700° C. until at least 95% of the K ions are replaced by Pb ions, and more preferably, 97% to effectively 100% substitution occurs.

In one aspect, the polycrystalline bodies upon which the substitution is effected, are typically tubes of 10 cm length, 1 cm diameter, and 1 mm wall thickness. Alternatively, the substitution has been effected on small discs of ⅜ths inch diameter and 40/1,000ths inch thick. The source of K ions for the K substitution is typically KCl. Alternatively, KSO$_4$ can be employed. With respect to the source of Pb ions, typically a molten bath of PbCl$_2$ is employed. Other sources can be molten baths of PbNO$_3$, PbBr$_2$, or PbI$_2$.

With respect to the Na-$\beta''$-alumina, it is conventional and various types of it can be employed. One possibility is to use the commercially available and conventionally known lithia-stabilized Na-$\beta''$-alumina. Alternatively, if it is desirable to prepare the Na-$\beta''$-alumina in situ, it is possible to manufacture the magnesia-stabilized form of Na-$\beta''$-alumina such as is disclosed in the above-discussed Dunn and Farrington article. Still further, the Na-$\beta''$-alumina can be manufactured by the process discussed in the article "Potassium-$\beta''$-Alumina Membranes", by G. M. Crosby and G. J. Tennenhouse, April, 1982, Vol. 65, No. 4, Journal of the American Ceramics Society, whose disclosure is incorporated herein by reference.

DETAILED DISCUSSION OF THE INVENTION

This invention is directed to a process for preparing impermeable, polycrystalline samples of Pb-$\beta''$-alumina ceramic from Na-$\beta''$-alumina ceramic by ion exchange. In accordance with the invention, Pb ions can be introduced into polycrystalline samples of material with the $\beta''$-alumina structure without causing cracking of the sample. Prior to this invention, applying the techniques used to prepare single crystal Pb-$\beta''$-alumina from single crystal Na-$\beta''$-alumina to the fabrication of polycrystalline Pb-$\beta''$-alumina from Na-$\beta''$-alumina always caused cracking of the samples, rendering them unusable. The prior art method was a singlestep ion exchange in which the Na ions in the original Na-$\beta''$-alumina material were replaced by Pb ions by immersion of the sample in a molten Pb salt. The $\beta''$-alumina crystal structure is anisotropic so that replacement of the smaller Na ion by the larger Pb causes an anisotropic lattice expansion. When this method is used with polycrystalline samples, the resultant stresses from the anisotropic lattice expansion lead to microscopic and macroscopic cracking of the polycrystalline sample.

In accordance with the invention, a two-step ion exchange technique is provided which prevents the build-up of stresses sufficient to crack the sample upon replacement of Na by Pb. The first step generally comprises the use of a vapor phase exchange of Na by K in a KCl vapor at an elevated temperature, followed by an exchange of Pb for K by immersing the sample in a molten Pb salt. Since the K ion is larger than the Na ion, an initial anisotropic lattice expansion occurs upon substitution of K for Na. However, at this elevated temperature wherein the vapor phase exchange occurs, the lattice structure relaxes accommodating the increased lattice strain, and thereby eliminates the internal stresses preventing the sample from cracking. The details of such a step are generally taught by U.S. Pat. No. 3,446,677 of G. J. TENNENHOUSE, and in the article "Potassium Beta''-Alumina Membranes" previously discussed, whose disclosures are incorporated herein by reference. Slight modifications to the general process taught therein are employed in the present invention as will be discussed in greater detail hereinafter.

With respect to the second step, the K is replaced by Pb by immersion of the sample in a molten Pb salt, typically PbCl$_2$, which results in a lattice contraction. However, the resultant stresses are not sufficient to crack the sample. In accordance with the invention, a sample of the polycrystalline Na-$\beta''$-alumina, which has been obtained either by in situ preparation as previously discussed, or from a commercial source, is subjected to a first step wherein the Na ions in the polycrystalline sample are replaced with K ions. In accordance with the method, the Na ion containing crystalline sample is contacted at temperatures above about 900° C., preferably greater than 1,000° C., and more preferably about 1,140° C. with K ions in the form of a vapor capable of substituting K ions into the polycrystalline structure for Na ions therein, for a time sufficient to cause replacement of at least 90% of the Na ions with K ions, preferably at least 95%, and more preferably about 97% to effectively 100%. This first step is effected by suspending the Na-$\beta''$-alumina sample above KCl in a covered alumina crucible, said crucible being placed in an alumina muffle with a nitrogen atmosphere flowing therethrough. The temperature is first raised to about 1,000° C. and after holding at that temperature for a specified amount of time, gradually raised at a predetermined rate to about 1,075° C. and also held there for a predetermined amount of time, typically three hours, and then heated to about 1,140° C. and held there for a sufficient amount of time to effect greater than 97% substitution of sodium with potassium ions.

The resultant polycrystalline sample containing K ions substituted for the original Na ions is then subjected to a second step wherein the K ions are replaced by Pb ions.

In this second step, a Pb salt, preferably PbCl$_2$, in powder, granules, or other solid form, is placed in a quartz container at room temperature. Other sources of Pb ions which can be employed include PbNO$_3$, PbBr$_2$, or PbI$_2$. The salt, typically PbCl$_2$, is heated to a temperature of at least about 500°-700° C., more preferably 700° C. and no greater than 1,300° C. The temperature must merely be sufficient to cause melting of the salt and sufficient for the K and Pb ions to be mobile in the $\beta''$-alumina sample. The K-substituted sample is then immersed in the Pb salt for a time sufficient to effect at least 90% substitution of the cations in the sample with Pb ion, and preferably at least 95%, and more preferably greater than about 97% to effectively 100% substitution. This second step is conducted with an inert gas being passed over the PbCl$_2$ bath. Typically, the inert gas is nitrogen, although argon or another inert atmosphere can be employed. The time of immersion can range between a few minutes to five to ten hours depending on the sample size. For example, at 700° C., a sample comprising a small disc of ⅜ths inch diameter and 40/1,000ths inch thick will require five to ten hours to achieve greater than 97% substitution.

Although the invention has generally been described as a two-step procedure wherein Na ions are first replaced with K ions, with the K ions later being replaced with Pb ions, other variations as may be obvious to those of ordinary skill in the art can be performed to substitute other large cations into the $\beta''$-alumina lattice. For instance, in the first step, if instead of substituting monovalent K for the Na, other monovalent ions such as Rb or Cs ions are employed, this would allow ions even larger than Pb to be substituted in the second step. In this case, for example, CsCl would be employed as the source of Cs ions in the vapor phase exchange. Furthermore, in the second step, instead of replacing the monovalent Cs ions with divalent Pb ions, the Cs ions can be replaced with, for example, the divalent Ba, Sr, Cd and Ca ions.

In a similar manner, instead of divalent ions being substituted in the second step, the substitution can be effected with trivalent cations. Included among these are, for example, La and other trivalent rare earth ions. With respect to the second substitution by immersion, it is only required that the ion substituted in the $\beta''$ alumina structure, in the second step, be larger than the Na ion and not larger than the ion substituted in the $\beta''$- alumina structure in the first step. Additionally, this two-step substitution method can be employed to substitute larger ions into $\beta''$-ferrite, $\beta''$-gallate, and other similar structures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are atomic percent of substituted ions relative to the Na ions in Na-$\beta''$-alumina.

EXAMPLE 1

Samples of lithia-stabilized Na-$\beta''$-alumina, which were commercially obtained, were suspended above reagent-grade KCl in covered alumina crucibles. The crucibles were then placed in alumina muffles, and a nitrogen atmosphere was flowed therethrough. The KCl and Na-$\beta''$-alumina was heated from room temperature at a rate of 100° C. per hour to a temperature of 1,015° C. and held at that temperature for six hours. Subsequently the temperature was increased at a rate of 190° C. per hour to arrive in twenty minutes at a temperature of 1,078° C. The samples were held at this temperature for three hours, and then heated further at a rate of 190° C. per hour to arrive at a temperature of 1,140° C. and held for seventy-two hours. Thereafter, the samples were allowed to cool at a rate of 100° C. per hour. The samples were weighed to determine the extent of exchange. If the exchange was less than 98%, the process was repeated, omitting the first two temperature increase steps and heating only at 1,140° C. until greater than 98% exchange of K ions for Na ions was achieved. Thus, samples of substantially pure polycrystalline K-$\beta''$-Al$_2$O$_3$ were obtained.

EXAMPLE 2

The samples obtained from example 1 were placed in a quartz container with PbCl$_2$ in powdered form at room temperature. Inert gas was passed over the PbCl$_2$, e.g., nitrogen, and the sample and the PbCl$_2$ were heated to temperatures of 550°-700° C., and, in one preferred example, to 700° C. The samples of the K-$\beta''$-alumina were discs of $\frac{3}{8}$ths inch diameter and 40/1,000ths inch thick, and tubes of 10 cm length, 1 cm diameter and 1 mm wall thickness. After repeating the example several times with the various samples and holding the $\beta''$-alumina sample of example 1 in the molten PbCl$_2$ for times of five to ten hours, the samples were removed, cleaned in a conventional manner, and weighed. Elemental analysis of the samples revealed that substantially all of the K and any residual Na were displaced by Pb without cracking of the sample.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for substituting Pb ions for Na ions in a formed polycrystalline structure body of $\beta''$-alumina consisting essentially of an Al and O lattice and of Na ions which migrate in relation to the Al and O lattice of said structure under the influence of an electric field, said method comprising heating said polycrystalline structure, contacting said structure with a vapor source of K ions heated to a temperature essentially equal to the temperature of said polycrystalline structure, maintaining said structure and said source of K ions at said temperature, said temperature being sufficient to cause at least about 90% of the Na ions in said structure to be replaced by K ions, immersing the resultant structure in a molten Pb salt, and maintaining said structure immersed in said molten Pb salt until at least about 90% of the K ions are replaced by Pb ions, whereby a Pb-$\beta''$-alumina polycrystalline structure substantially free of cracks is obtained.

2. A method as in claim 1 wherein said contacting with said source of K ions is conducted by heating dry KCl to provide KCl vapor.

3. A method as in claim 1 wherein immersing in a molten Pb salt is conducted in molten PbCl$_2$.

4. A method as in claim 3 wherein said immersing is conducted in a molten PbCl$_2$ bath at a temperature of about 700° C.

5. A method as in claim 3 wherein said immersing in conducted in a molten PbCl$_2$ bath at a temperature of at least about 550° C.

6. A method for substituting cations for Na ions in a formed polycrystalline structure body of Na-$\beta''$-alumina, Na-$\beta''$-ferrite, or Na-$\beta''$-gallate consisting essentially of trivalent cation and O lattice and of Na ions which migrate in relation to the trivalent cation and O lattice of said structure under the influence of an electric field, said method comprising heating said body, contacting said body with a vapor source of K, Rb, or Cs ions heated to a temperature essentially equal to the temperature of said body, maintaining said body and said source of ions at said temperature, said temperature being sufficient to cause at least about 90% of the Na ions in said body to be replaced by said vapor source ions, immersing the resultant body in a molten salt having divalent and trivalent cations larger than Na ions and no greater than said vapor source ions, and maintaining said body immersed in said molten salt until about 90% of said vapor source ions are replaced by said divalent or trivalent cations, whereby a substituted formed polycrystalline body substantially free of cracks is obtained.

7. A method as in claim 6 wherein said first ions are Cs ions, and the first substitution is effected with a vapor of CsCl.

8. A method as in claim 6 wherein said divalent cations are Ba ions and said first ions are K ions.

9. A method as in claim 6 wherein said divalent cations are cations having a size greater than Pb ions.

10. A method as in claim 6 wherein said second substitution is effected with La or other trivalent cations.

* * * * *